March 11, 1930.  J. W. PIPPIN  1,750,489
DEVICE FOR SEPARATING WATER FROM OIL
Original Filed March 2, 1927
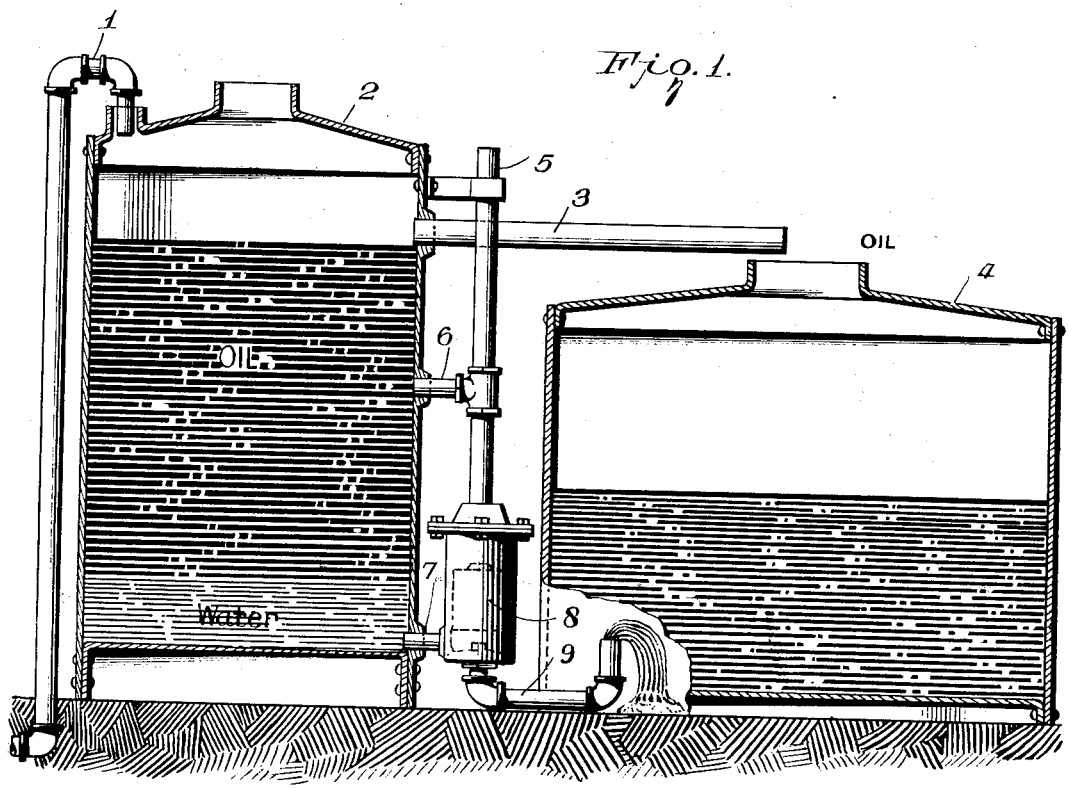
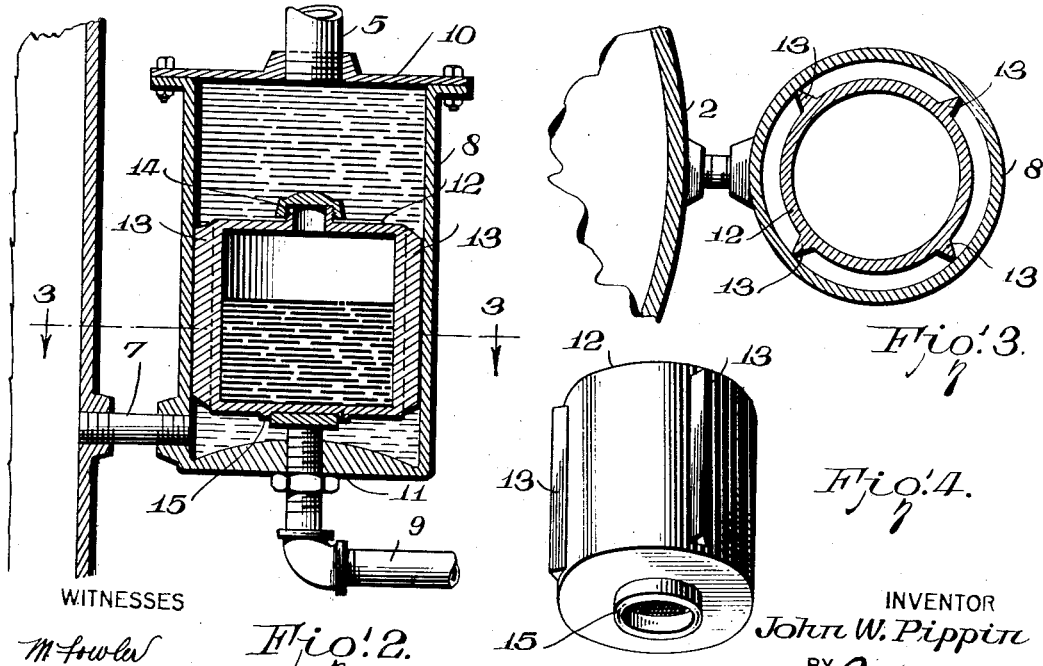
INVENTOR
John W. Pippin Patented Mar. 11, 1930

1,750,489

UNITED STATES PATENT OFFICE

JOHN W. PIPPIN, OF HEBBRONVILLE, TEXAS

DEVICE FOR SEPARATING WATER FROM OIL

Application filed March 2, 1927, Serial No. 172,176. Renewed September 7, 1929.

This invention has for its object the provision of means for separating two immiscible liquids of different specific gravities. In the form here presented it is applied particularly to the separation of water from oil.

Settling tanks for oil are commonly employed in which the contained water gravitates to the bottom of the tank, the oil forming a supernatant layer. The water is usually bled off by hand, that is by opening a valve in the bottom of the tank and allowing the water to flow out until the oil appears. This method is open to the objection that the operator frequently forgets his duties or absents himself from his post with consequent loss of valuable oil.

In the device which I have provided, the operation is automatic and sure. Also a cleaner separation is accomplished and operation is continuous.

Referring to the accompanying drawings,

Figure 1 is a side elevation in cross section of the device,

Figure 2 is a side elevation in cross section of the float chamber, which in Fig. 1 is shown between the two tanks, Figure 3 is a plan view in section of the float chamber through the float showing how the chamber is connected to the tank, Figure 4 is a perspective view of the float.

1 indicates a pipe from a well or wells, delivering a mixture of oil and water. 2 is a settling tank, vented to the atmosphere. 3 is an overflow pipe by which means the supernatant layer of oil from time to time overflows into storage tank 4, also open to the atmosphere.

5 is a standpipe of substantial diameter, about as high as tank 2 attached firmly to said tank at its top and also attached at the middle and bottom thereof by pipes 6 and 7 leading into tank 2 and into the standpipe and float chamber respectively. The latter is indicated by the numeral 8. A waste pipe 9, for the outflow of water, completes the device.

A further description of the float chamber, that is, Figure 2, follows:

8 is a cylindrical casing, flanged as to its upper rim and provided with a bolted lid 10. 5 indicates the standpipe previously referred to. 7 is an entrance pipe for oil or water. 9 is the exit pipe for water. The height of the chamber and length of the exit pipe inside it is adjustable by the lock nut 11, to regulate the time of seating of the float.

12 indicates a hollow metal float, which in operation is partially or wholly filled with oil so that it will sink in oil, but float in water. It is provided on its circumference with longitudinal triangular ribs 13 to reduce friction against the side walls of the chamber. Its top wall is provided with a liquid-tight filling spout and screw cap therefor, 14. Its bottom is provided with a valve seat 15 preferably of leather which when the float is in its nethermost position, fits over the mouth of the exit pipe 9 so that the flow of liquid through that pipe is shut off.

In operation the device functions as follows:

As long as water from the bottom layer of tank 2 flows through chamber 8, the float within it will remain suspended in the water. When the flow of water ceases, and that of oil starts, the float will then be heavier than the oil and will sink, the valve seat 15, which may be of any conventional pattern, will fit over the mouth of pipe 7 and shut off the flow. The oil level rising in tank 2 will finally cause oil to overflow into tank 4.

The device may be regulated by adjusting the oil level within the float or varying the specific gravity of said oil, and also by adjusting the height of the outlet pipe.

I claim:

In a device of the character described, a cylindrical float chamber having an outlet in its bottom, a hollow float therein provided with an inlet at its upper end for the admission of ballasting liquid into the float, a closure for the inlet, a valve element carried by the bottom of the float and adapted to seat upon the outlet, and a plurality of radially disposed ribs formed on the vertical walls of the float, the ribs being V-shaped in cross section and having their outer edges in contact with the walls of the float chamber, the ribs serving to guide the float in a true vertical direction, and also to prevent rotation of the float in the liquid contained in the float chamber.

JOHN W. PIPPIN.